Patented Aug. 20, 1946

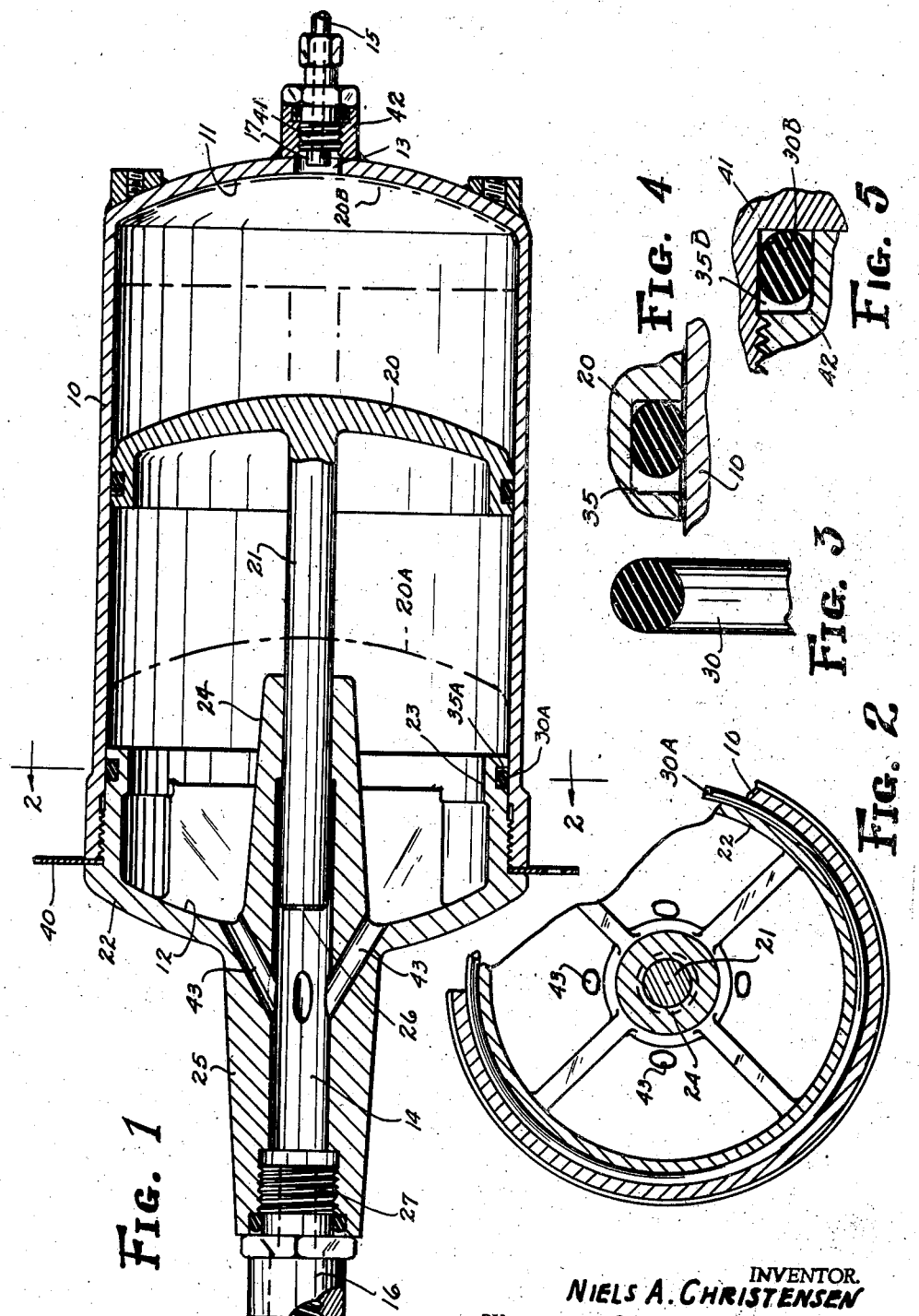

2,406,197

UNITED STATES PATENT OFFICE 2,406,197

ACCUMULATOR

Niels A. Christensen, South Euclid, Ohio

Application May 26, 1943, Serial No. 488,530

4 Claims. (Cl. 138—31)

This invention relates to hydro-pneumatic accumulators which are adapted for use in power systems wherein one fluid under pressure is utilized as potential energy for performing work through the medium of another fluid. The accumulator is well adapted for use in aircraft operation where space limitations and weight are essential factors for consideration.

The difficulty of obtaining an effective seal between gaseous and liquid mediums has heretofore necessitated in aircraft operation the use of an accumulator of the diaphragm type wherein the marginal portions of the diaphragm are fixed between the casing sections. While this construction maintains an effective seal between the air on one side of the diaphragm and the oil on the other side, nevertheless, the movement of the diaphragm is so restricted that in order to obtain movement of a large volume of oil, it is necessary to use an accumulator of great size and weight.

The restriction on space within an airplane presents a problem, particularly in military aircraft where hydraulic means are utilized for operating many appliances that normally are not used in commercial aircraft. The problem is to provide a structure that is light in weight, that is capable of moving a large volume of oil under high pressure to the various power units, and that can be installed in a small space and effectively sealed against leakage between the gaseous and liquid compartments.

The present invention has solved the foregoing problem by utilizing a piston that acts as a partition between the gaseous and liquid pressure mediums and that is guided independently of any metal to metal contact between the piston and the cylinder walls. Additionally, the piston is provided with a sealing device that effectively seals the two fluid chambers while at the same time allowing movement of the piston in accordance with variations in pressure on opposite sides thereof during use.

The invention is shown by way of illustration in the drawing, wherein Fig. 1 is a longitudinal sectional view through the accumulator embodying my invention; Fig. 2 is a section taken on a radial plane indicated by the line 2—2 in Fig. 1; Fig. 3 is a section taken diametrically through the sealing ring; Fig. 4 is a section on an enlarged scale showing the relationship of the sealing ring to the piston groove, and Fig. 5 is a cross sectional view on a large scale showing a method of sealing the apertures in the end wall of the cylinder.

The accumulator embodying my invention comprises a cylinder 10 which has end walls 11 and 12, each of which has a passageway designated 13 and 14, respectively, through which fluid may be admitted to the cylinder. A conduit 15 is attached to one end of the cylinder for communication with the passageway 13, while another conduit 16 is attached to the other end for communication with the passageway 14. In practice, air under pressure is forced into the cylinder through the conduit 15 and is held therein by means of a check valve, such as that used in an automobile tire and indicated at 17, while the conduit 16 is connected to the hydraulic system with which the accumulator is intended to be used.

A movable partition, in the form of a piston 20, is disposed within the cylinder and is provided with a sealing arrangement for preventing leakage between opposite sides of the piston. The piston is guided by means of a rod 21 which projects into the member 22 which forms the cylinder wall 12. Preferably such member is a cup-like structure having a substantially cylindrical wall portion 23 which is adapted to extend into the cylinder and to be in threaded engagement therewith. The member may also have an extension 24 which projects into the cylinder and which functions to guide the piston rod as aforesaid. An outer extension 25 is arranged for receiving the conduit 16 and has sufficient length that when the piston reaches the end of its available movement toward the conduit 16, as indicated by the broken lines 20—A, the end 26 of the piston rod will clear the end of the nipple 27 which is utilized for connecting the conduit 16 to the extension 25. Similarly, the inner extension 24 is sufficiently long that when the piston is at the limit of its travel toward the conduit 15, as indicated by the broken line 20—B, the end of the piston rod is still disposed within the extension 24.

To seal the gas and liquid chambers which are formed in the cylinder by the piston, and at the same time to permit sliding action of the piston axially of the cylinder, I utilize an annular packing element 30 which may be made of solid rubber, or of a synthetic composition which is very dense and yet which possesses considerable liveliness and elasticity. Each ring is normally circular and prior to assembly has a circular cross section, such as is indicated in Fig. 3. The outer periphery of the ring is slightly larger than the bore of the cylinder so that when the ring is inserted in its groove 35, in the piston, and when the piston is slid into the cylinder, the ring will be compressed into a substantially ellipsoidal section, as is illustrated in Fig. 4.

The depth of the ring groove 35 is less than the normal diameter of the ring section, but the width is larger than the major axis of the ring in the ellipsoidal shape, as is shown in Fig. 4. The result of such relationship between the ring, cylinder and ring groove is that when the piston moves back and forth within the cylinder, the packing will oscillate within its groove, thereby effecting a kneading or working of the material. This keeps it alive and pliable, and eliminates scuffing which would otherwise be caused by the static sliding of the totally confined material along the surface. Such sealing device operates effectively to maintain a fluid tight seal between the gas on one side of the piston and the liquid on the other side of the piston.

The cylinder may be supported in any convenient manner, but for purpose of illustration, I have shown a supporting plate 40 which is clamped between one end of the cylinder and a shoulder on the member 22 and which is adapted to be attached in any convenient manner to the structure within which the accumulator is intended to be used. An effective way of sealing the member 22 is to utilize a sealing construction similar to that described for the piston, wherein the ring designated 30—A may be disposed within a groove 35—A adjacent the rim of the member 22. This arrangement enables the end member to be drawn up tightly against the end of the cylinder without placing any binding action upon the packing material.

The same principle of sealing utilized in the piston may be employed for sealing the nipples 27 and 41 in which case the groove may be formed in the end wall of the adjacent extension, as is shown in Fig. 5, where the extension is designated 42, and where the ring and groove are designated 30—B and 35—B respectively. This method of sealing permits the nipples to be drawn up tightly against the ends of the extension without placing clamping strain upon the packing material.

In practice, air under pressure is forced into the cylinder through the conduit 15, while oil under pressure is forced into the cylinder through the conduit 16, passageway 14, and oblique passageway 43, until the pressures reach the desired operating degree. The amount of air injected is such that when the system is normally ready for operation the piston is positioned approximately at the mid-portion of the cylinder. The source of air may then be disconnected, while that pumped into the cylinder is retained therein by the check valve 17. The air thus provides a source of potential energy for forcing oil within the cylinder into the system whenever demand for it occurs during use. The size of the cylinder may be adequate to cause the movement of a large quantity of liquid substantially instantaneously, wherefore, by proper selection of diameter and stroke, adequate supply can be maintained for assuring operation of any desired number of units at the same time. At the completion of use, the liquid is returned in the customary manner to a pump and is fed back into the system by a pump which operates automatically in any well known manner. This causes the piston 20 to reverse its path of movement until the normal position is again reached.

An advantage of the present invention is the fact that the sealing arrangement permits the use of the cylinder and piston as an accumulator, and thereby solves the problem that was inherent in the use of a diaphragm which necessarily had restricted movement by virtue of the fixed condition of the marginal portions of the diaphragm. The present invention eliminates one of the difficulties inherent in the use of the diaphragm, namely, the tendency to rupture upon the use of a high pressure, particularly when the diaphragm reaches a size large enough to produce a volume of the required amount. Any increase in the diameter of the diaphragm necessitates a corresponding increase in the size of the housing and, therefore, in the weight as well, which mitigates against use thereof in restricted spaces.

I claim:

1. An accumulator having in combination a cylinder, a piston disposed therein and operating as a partition to divide the cylinder into two chambers, means for introducing gas under pressure into one chamber, means for introducing liquid under pressure into the other chamber, the cylinder having end walls therein, one of the walls having a tubular portion extending into the cylinder and the piston having a rod projecting into and guided by such tubular portion, said piston having a sealing device to prevent the escape of fluid from one chamber to the other, said device including a groove in the piston and a resilient packing element disposed in the groove, the packing element being deformed by movement of the piston into the cylinder and the groove being larger than the deformed ring whereby the ring is free to oscillate upon reciprocating movement of the piston within the cylinder, said tubular portion having a laterally extending passageway establishing communication between the cylinder and the interior of the tubular portion.

2. An accumulator having in combination a cylinder, a piston therein, the cylinder having end walls one of which limits movement of the piston axially of the cylinder, one of the walls having a passageway therein through which gas under pressure may be forced into the cylinder, the other end wall having an aperture therein through which liquid under pressure may be forced into the cylinder, the piston having a rod adjacent the axis thereof and one of said walls having a bore therein for guiding the rod and for providing an auxiliary cylinder in which said rod is adapted to reciprocate, and said last mentioned wall having a passageway extending diagonally therethrough for establishing communication between the cylinders and a resilient packing ring carried by the piston for maintaining a fluid-tight seal between opposite sides thereof, the piston having a groove for receiving the ring, the depth of the groove being less than the normal cross sectional diameter of the ring, whereby the ring is deformed upon insertion into the cylinder, and the width of the groove being greater than the longest cross-sectional dimension of the deformed ring, whereby the ring has space in which to move with relation to the piston during reciprocation thereof.

3. In combination, a cylinder, a piston therein, a member attached to one end of the cylinder and providing an end wall thereof, said member having an inner and an outer extension, the piston having a guide rod movable into said extension and guided thereby, said extension having a passageway larger in cross sectional area than the cross sectional area of the piston rod to provide clearance for the flow of fluid between the rod and the extension, and said member having passageways extending laterally from the first-mentioned passageway to provide communication for the passage of fluid from the cylinder into said first named passageway.

4. An accumulator having in combination a cylinder with end walls, one of the walls having an externally projetcing tubular extension and an internally projecting tubular extension, said extensions having the axes of their bores aligned, there being a passageway from an intermediate region of said bores into the cylinder, a piston within the cylinder having a rod extending into the bores of the extensions, a packing between the periphery of the piston and the interior of the cylinder, a nipple carried by the outer extension and in communication with said bores, the nipple carried by the opposed head of the cylinder in communication with the interior of the cylinder.

NIELS A. CHRISTENSEN.